(12) United States Patent
Barge

(10) Patent No.: US 11,495,823 B2
(45) Date of Patent: *Nov. 8, 2022

(54) APPARATUS FOR THE MANUFACTURE OF BATTERY COMPONENTS

(71) Applicant: TBS ENGINEERING LIMITED, Gloucester (GB)

(72) Inventor: Chris Barge, Bristol (GB)

(73) Assignee: TBS ENGINEERING LIMITED, Gloucester (GB)

( * ) Notice: Subject to any disclaimer, the term of this patent is extended or adjusted under 35 U.S.C. 154(b) by 34 days.

This patent is subject to a terminal disclaimer.

(21) Appl. No.: 16/902,052

(22) Filed: Jun. 15, 2020

(65) Prior Publication Data
US 2020/0335812 A1 Oct. 22, 2020

Related U.S. Application Data

(63) Continuation of application No. 16/060,258, filed as application No. PCT/GB2016/053852 on Dec. 7, 2016, now Pat. No. 10,826,105.

(30) Foreign Application Priority Data

Dec. 7, 2015 (GB) .................................... 1521536

(51) Int. Cl.
*H01M 10/04* (2006.01)
*B65G 59/00* (2006.01)
(Continued)

(52) U.S. Cl.
CPC ........ *H01M 10/0404* (2013.01); *B65G 59/00* (2013.01); *B65H 31/3036* (2013.01);
(Continued)

(58) Field of Classification Search
None
See application file for complete search history.

(56) References Cited

U.S. PATENT DOCUMENTS 3,052,968 A 9/1962 Kerns
3,799,321 A 3/1974 Agui
(Continued)

FOREIGN PATENT DOCUMENTS

EP 1018909 A1 7/2000
JP H04206462 A 7/1992
(Continued)

OTHER PUBLICATIONS

Search Report for International application No. PCT/GB2016/053852, dated Mar. 23, 2017.
(Continued)

*Primary Examiner* — Gregg Cantelmo
(74) *Attorney, Agent, or Firm* — Marshall, Gerstein & Borun LLP

(57) ABSTRACT

An apparatus for separating battery plates includes a work surface for receiving a stack of battery plates, and an alignment mechanism for aligning the battery plates on the work surface. The work surface is movable between a first position in which it is angled with respect to a horizontal plane and a second position in which it is substantially aligned with the horizontal plane. When the work surface moves between the first and second position adjacent battery plates of the stack are displaced relative to each other.

11 Claims, 17 Drawing Sheets

(51) Int. Cl.
   *H01M 10/14* (2006.01)
   *B65H 31/30* (2006.01)
   *B65H 31/34* (2006.01)
   *H01M 4/06* (2006.01)
   *H01M 4/68* (2006.01)

(52) U.S. Cl.
   CPC ............ *B65H 31/34* (2013.01); *H01M 10/14* (2013.01); *B65H 2301/4224* (2013.01); *B65H 2301/42242* (2013.01); *B65H 2301/42244* (2013.01); *H01M 4/06* (2013.01); *H01M 4/68* (2013.01); *Y10S 414/12* (2013.01)

(56) References Cited

U.S. PATENT DOCUMENTS

| | | | |
|---|---|---|---|
| 4,004,699 A | 1/1977 | Connon et al. | |
| 4,478,403 A * | 10/1984 | Byrt | B65H 31/32 271/189 |
| 4,664,581 A | 5/1987 | Matthews | |
| 4,710,089 A * | 12/1987 | Schneider | B65G 59/08 221/227 |
| 4,802,808 A | 2/1989 | Wolk et al. | |
| 4,824,307 A * | 4/1989 | Johnson | B65H 33/18 414/798.2 |
| 5,129,643 A * | 7/1992 | Johnson | B65H 33/12 271/216 |
| 5,279,196 A * | 1/1994 | Mohr | B26D 7/015 414/907 |
| 5,431,530 A | 7/1995 | Kobayashi et al. | |
| 6,601,490 B1 * | 8/2003 | Gross | B26D 7/015 83/27 |
| 2003/0012636 A1* | 1/2003 | Fujino | B65G 59/045 414/795.8 |
| 2010/0017014 A1* | 1/2010 | Schwetz | B65G 59/045 700/213 |
| 2012/0099956 A1 | 4/2012 | Diehr et al. | |

FOREIGN PATENT DOCUMENTS

| | | |
|---|---|---|
| JP | 2008108676 A * | 5/2008 |
| JP | 2014238922 A | 12/2014 |

OTHER PUBLICATIONS

Written Opinion for International application No. PCT/GB2016/053852, dated Mar. 23, 2017.
United Kingdom International Search Report for application No. GB1521536.1, dated Jul. 18, 2016.
United Kingdom Search and Examination report for Application No. GB1521536.1, dated Jul. 27, 2018.
Office Action for U.S. Appl. No. 16/060,258, dated Mar. 13, 2020.

* cited by examiner

APPARATUS FOR THE MANUFACTURE OF BATTERY COMPONENTS

FIELD OF THE INVENTION

The present invention relates to an apparatus for manufacturing battery components and a method of manufacture for battery components.

RELATED APPLICATIONS

This application is a continuation of U.S. Pat. No. 10,826,105, issued Nov. 3, 2020 and filed Jun. 7, 2018, the entirety of which is hereby incorporated by reference herein.

BACKGROUND OF THE INVENTION

The term "battery" is used herein to include accumulators. In a conventional lead-acid battery it is customary to connect together the plates of each stack by means of a lead strap or post which is fixed to aligned lugs or tabs on the plates.

In the manufacture of batteries, particularly for example lead acid batteries, battery plates are manufactured by known methods, formed into stacks or groups and then dried or cured. As a result of the drying or curing process, adjacent plates in the stacks (groups) may become stuck or bonded together.

Following plate production and curing, each individual plate is encased in an envelope or wrapper before the plates are placed in the battery casing. Alternatively, a separator layer may be placed between adjacent plates. In the case of enveloping, this is generally an automated process, carried out in an enveloping machine which takes individual plates one at time from a stack and places each one in an envelope or wrapper. If adjacent plates are stuck or bonded together it can be difficult or impossible for the enveloping machine to pick up a single plate.

To overcome this problem, an operator has to manually separate the plates prior to loading the plate stack in the post processing apparatus, for example prior to loading onto a conveyor for onward transport to the enveloping machine. The operator must first pick up each battery plate stack and drop it onto a conveyor belt, or other work surface, so that the lower edges of the plates impact the work surface. This impact breaks some of the bonds. The operator then manually manipulates the stack of so that the plates move relative to each other which further separates adjacent plates. The operator must then form the plates into a neatly aligned stack for further processing.

The manual plate separation or plate breaking is physically demanding work for the operator because each stack of plates can weigh in excess of 8 Kg. Medium to long term working in such a role can lead to repetitive stress injuries.

Further, the lead plates are coated in lead oxide paste, and each time that the plates are manipulated, particularly when they are impacted on a work surface, particles of lead oxide dust are released into the air. Naturally operators working in such an environment are generally provided with suitable Personal Protective Equipment such as masks and eye protection. However, there is still an inherent risk to health and safety working in such an environment.

Embodiments of the invention seek to provide apparatus which overcome some of these problems.

SUMMARY OF INVENTION

According to a first aspect of the present invention there is provided an apparatus for separating battery plates comprising:

a work surface for receiving a stack of battery plates, the work surface being moveable between a first position in which it is angled with respect to a horizontal plane; and a second position in which it is substantially aligned with the horizontal plane such that in use, when the work surface moves between the first and second position adjacent battery plates of the stack are displaced relative to each other; and an alignment mechanism for aligning the battery plates on the work surface.

The work surface may be pivotable about an axis extending parallel to one side edge of the work surface. The work surface may be pivotable about an axis provided towards one side of the work surface. The work surface may be pivotable about an axis extending through a centre of the work surface.

In some embodiments, the apparatus may further comprise a loading mechanism. The loading mechanism may be arranged to receive a stack of plates in a first orientation and position the plates in a required orientation for separating. For example, the loading mechanism may be arranged to rotate the stack of plates from a substantially horizontal position to a substantially vertical position.

For example, the loading mechanism may comprise an arm coupled to the work surface and which may be pivotable around an axis between a substantially horizontal and a substantially vertical position. When the arm is in the substantially horizontal position, the work surface may be pivotable between the first and second positions. When the arm is in the substantially vertical position, the work surface may be pivotable between a position angled with respect to the vertical plane; and a position substantially aligned with the vertical plane.

The apparatus may be provided with at least one actuator for moving the work surface between the first and second positions. The actuator may be a hydraulic actuator. The actuator may be provided below the work surface.

The provision of the loading mechanism may provide an apparatus which can be either top-loaded or side-loaded. When top loading the arm is in the horizontal position, with the stack of battery plates positioned above the work surface, and aligned with lower edges of the plates facing the work surface. When side-loading the arm is in the vertical position, with the stack of battery plates positioned next to the work surface, and aligned with side edges of the plates face the work surface. It will be appreciated that it may be useful for a single machine to allow either top or side loading depending upon the particular use.

In embodiments using, top-loading the stack is placed or dropped so that the lower edges of the plates impact the inclined work surface and adjacent battery plates are vertically displaced relative to each other.

Alternatively, in embodiments using side-loading the stack may be clamped in place, and the arm pivoted from the vertical position to the horizontal position. In the clamped position the stack may have a clearance gap to the work surface. The clearance gap enables the stack to be dropped once in the horizontal position so that the side edges of the plates (now the lower edges) impact the inclined work surface and adjacent battery plates are vertically displaced relative to each other.

The apparatus may be provided with two work surfaces. Each work surface may be provided with a respective alignment mechanism.

The apparatus may be configured such that the first and second work surfaces are moved into horizontal alignment simultaneously or sequentially.

The apparatus may be configured such that the alignment mechanisms operate simultaneously or sequentially.

The or each work surface may be provided with a displacement mechanism for laterally displacing the plates of the stack relative to each other.

The displacement mechanism may displace the plates substantially horizontally.

The or each displacement mechanism may include two opposing blocks provided on or above the or each work surface. The blocks may be moveable between a retracted position and an operational position, such that in use in the operational position the blocks contact the side edges of the battery plates.

The two opposing blocks may act as jaws. The blocks may be provided above the work surface, such that in use, when they are in their retracted position they are located to each side of stack on the work surface.

Alternatively, the or each displacement mechanism may include one moveable block, and one stationary block.

The blocks may be provided at opposite sides of the work surface, such that in use, the blocks are facing the side edges of the battery plates.

In embodiments using a top loading configuration, the blocks may move from the retracted position to the operational position to clamp the stack of battery plates. Once the arm has pivoted to the horizontal position, the blocks may release the stack of battery plates to drop them onto the work surface. The blocks may then proceed to laterally displace the plates of the stack relative to each other.

Opposing surfaces of the blocks may have corresponding profiles. The profiles may be non-perpendicular to the block movement direction, such that as the blocks move to their operational position the opposing surfaces cause each battery plate to move substantially horizontally by a different amount to its adjacent plate(s).

A first block may have a convex profile, and the opposing block may have a corresponding convex profile. The blocks may have arrow-shaped profiles. The blocks may have curved or saw-tooth profiles. The blocks may have planar profiles extending at an angle with respect to the movement direction. The blocks may be provided with any suitable profiles which when moved into the operational position can contact the side edges of the battery plates and cause each battery plate to move substantially horizontally by a different amount to its adjacent plate(s).

The or each alignment mechanism may be provided on or above the or each work surface. The alignment mechanism may be moveable between an open position and a closed position, in which in use, it contacts the sides of the battery plates and moves them into an aligned stack. The alignment mechanism may move the battery plates into a neatly aligned stack, so that the stack can be moved on to a subsequent manufacturing station or apparatus.

The alignment mechanism may include a pair of blocks having opposing flat surfaces, which in use face the side edges of the battery plates.

The alignment blocks may be provided above or below the displacement mechanism. In the closed position, the alignment blocks may be spaced apart by a distance substantially equal to a battery plate width. The alignment mechanism may comprise two moveable alignment blocks, which move towards each other to the closed position. Alternatively, the alignment mechanism may include a stationary alignment block, and a moveable alignment block.

The or each work surface may be provided with an agitator for vibrating a stack of plates on the work surface.

The agitator may vibrate the work surface when it is in its second position. The agitator may be a vibration mechanism provided on or associated with the work surface, for vibrating the work surface.

The or each work surface may be provided with a second displacement mechanism for displacing the plates of the stack relative to each other in a direction opposite to the displacement caused by the first displacement mechanism.

The second displacement mechanism may comprise two opposing blocks (or jaws) provided on or above the or each work surface, the blocks being moveable between a retracted position and an operational position, such that in use in the operational position the blocks contact the side edges of the battery plates A first block may have a convex profile, and the opposing block may have a corresponding convex profile. The blocks may have arrow-shaped profiles. The blocks may have curved or saw-tooth profiles. The blocks may have planar profiles extending at an angle with respect to the movement direction. The blocks may be provided with any suitable profiles which when moved into the operational position can contact the side edges of the battery plates and cause each battery plate to move substantially horizontally by a different amount to its adjacent plate(s).

In some embodiments, the or each work surface may be provided with a splitting mechanism for laterally breaking the separated stack of battery plates into a plurality of stacks. A sensor may be provided for detecting the width of the stack of plates between the two blocks. The sensor may be an optical sensor or a vision system. The sensor may detect whether or not the stack of plates is longer than a specified required width, such as longer than 100 mm, preferably longer than 150 mm. If the stack is found to be longer than the specified width, the splitting mechanism is activated to break the stack into two smaller stacks each with a width less than the specified height. The splitting mechanism may for example split the stack into at least one stack of the specified width.

The splitting mechanism may comprise a vertical rod moveable between a stored position below the top of the work surface, and a splitting position where the rod breaks the stack of plates into two. The rod is located perpendicular to the work surface, and is received within at least one aperture through the work surface below the stack of battery plates in use. The vertical rod comprises a tapered, or v-shaped, first end located adjacent to the work surface, and a second end attached to an actuator. If the sensor detects that the stack is greater than the specified width, the actuator moves the vertical rod from the stored position to the splitting position where it penetrates the stack of battery plates between two individual plates.

In some embodiments, in use, the arm may be rotated from the horizontal to the vertical position where the one or more stacks of battery plates may be removed from the apparatus.

According to a further aspect of the present invention, there is provided a method of separating battery plates comprising (a) dropping at least one stack of battery plates onto an inclined work surface;

(b) moving the work surface to a substantially horizontal orientation; and (c) operating an alignment mechanism to align the plates of the at least one stack.

In step (a) the at least one stack of battery plates is oriented with the bases (lower edges) of the plates facing downwards, so that the bases of the plates impact on the inclined work surface as the stack is dropped and adjacent battery plates are displaced relative to each other.

Alternatively, in some embodiments the work surface may be oriented substantially vertically and the at least one stack of battery plates may be oriented with the bases (lower edges) of the plates facing sideward towards the work surface. The at least one stack of battery plates may clamped in place, and the work surface rotated such that it is oriented at an angle with respect to a horizontal plane. The bases of the plates may then be released and impact on the inclined work surface as the stack is dropped and adjacent battery plates are displaced relative to each other.

The method may also including after step (b), a step (b1) operating a displacement mechanism to laterally displace the plates of the at least one stack relative to each other. The displacement mechanism may also operate as a clamp for clamping the stack of battery plates for embodiments where the work surface is oriented substantially vertically.

Step (b1) may include displacing the plates in a substantially horizontal direction, such that each battery plate moves substantially horizontally by a different amount to its adjacent plate(s).

The plates may be displaced in a horizontal direction by moving a pair of blocks having opposing surfaces from a retracted position into an operational position.

Step (b) may further include vibrating the work surface.

Step (b) may include vibrating or agitating the work surface when it is in its substantially horizontal orientation.

The method may further comprise a step (d) which includes splitting the at least one stack of battery plates into a plurality of stacks, such as two stacks.

According to a further aspect of the present invention, there is provided an apparatus for separating battery plates comprising:
   a work surface for receiving a stack of battery plates;
   a first displacement mechanism configured to shear the plates of the stack relative to each other in a first direction; and
   an alignment mechanism for aligning the battery plates in a stack.

The first displacement mechanism may shear the plates substantially vertically.

The apparatus may also comprise a second displacement mechanism configured to shear the plates of a stack relative to each other in a second direction.

The second displacement mechanism may be configured to displace the plates in a direction which is substantially perpendicular to the first direction.

The first displacement mechanism may shear the plates substantially vertically. The second displacement mechanism may shear the plates substantially horizontally.

The first displacement mechanism may displace the plates in a substantially horizontal direction, such that each battery plate moves horizontally by a different amount to its adjacent plate(s) displacing the plates in a substantially horizontal direction, such that each battery plate moves horizontally by a different amount to its adjacent plate(s).

The first displacement mechanism may comprise a mechanism for moving the work surface between
   a first position in which it is angled with respect to a horizontal plane; and
   a second position in which it is substantially aligned with the horizontal plane.

In use, the movement of the work surface between the first and second positions displaces the plates vertically with respect to each other.

The apparatus may include a third displacement mechanism.

The third displacement mechanism may in use displace the plates substantially horizontally, in a direction opposite to that caused by the second displacement mechanism.

The apparatus may further include a splitting mechanism. The splitting mechanism may in use laterally break the stack of battery plates into a plurality of stacks, such as two stacks.

For example the splitting mechanism may split the separated stack of plates to provide at least one stack of a required size.

According to a further aspect of the present invention, there is provided an apparatus for processing battery plates comprising:
   an automatic feed mechanism for transferring an individual stack of battery plates from a supply of battery plates:
   a battery plate separator apparatus for receiving the stack of battery plates, the apparatus including:
      a work surface for receiving in use at least one stack of battery plates, and
      a displacement mechanism for separating the battery plates within the or each stack of plates; and
   a supply mechanism for transferring a separated stack of plates for subsequent processing.

The apparatus for processing battery plates may for example be configured as an automated manufacturing cell.

The battery plate separator apparatus may further comprise an alignment mechanism for aligning the battery plates neatly in a stack.

The battery plate separator apparatus may further comprise a splitting mechanism for breaking the stack of battery plates into two.

The supply mechanism may be a conveyor belt for moving stacks of plates to a further processing apparatus, for example a plate enveloping apparatus.

The feed mechanism may transfer the stacks of plates from the plate separator apparatus to the supply mechanism after separation.

The feed mechanism may comprise at least one robot.

The robot may include at least one gripper mechanism configured to pick up a stack of battery plates. The robot arm may include two gripper mechanisms, each configured to pick up a stack of battery plates. The robot may pick up two stacks simultaneously. The robot arm may pick up a first stack.

The robot may be provided with a sensor for detecting the presence or position of a stack of plates for processing. The sensor may be an optical sensor or a vision system.

The apparatus for processing battery plates may include a battery plate separator apparatus as described above. The apparatus may include two battery plate separator apparatuses. The feed mechanism may be configured to simultaneously move two stacks of battery plates.

The supply of plates may be provided on a pallet containing a plurality of stacks and the sensor identifies at least one datum point on the pallet.

The sensor may identify an edge or corner of the pallet. The sensor may use the datum point to determine alignment and/or position of the stack or stacks of plates on the pallet.

According to a further aspect of the present invention, there is provided a method of separating battery plates comprising:
   (a) moving at least one stack of battery plates with an automated feed mechanism from a supply station to a battery plate separator apparatus;

(b) operating the battery plate separator apparatus to displace the plates of the at least one stack of battery plates relative to each other, thereby separating adjacent battery plates;

(c) aligning the stack of battery plates;

(d) moving the at least one stack of battery plates with an automated transfer mechanism from the battery plate separator apparatus to an end station for further processing.

The automated feed mechanism of step (a) may also act as the automated transfer mechanism of step (d).

The battery plate separator apparatus may include some or all of the features as described above.

Step (a) may include dropping the least one stack of battery plates onto a work surface on the battery separator apparatus. Step (a) may comprise moving two stacks of battery plates. Step (a) may comprise moving the feed mechanism, for example a robot, to a first position to pick up a first stack of battery plates, then moving the arm to a second position to pick up a second stack. Alternatively, the feed mechanism, for example a robot, may pick up two stacks simultaneously.

The at least one stack of battery plates may be received on an inclined work surface of the battery plate separator apparatus. Step (b) may include operating the battery plate separator to move the work surface to a substantially horizontal orientation, thereby displacing the battery plates vertically relative to each other.

The stack of battery plates may be dropped by the automated feed mechanism from above onto the inclined work surface of the battery plate separator apparatus. The automated feed mechanism may drop the battery plates directly from above onto the work surface.

In alternative embodiments, the automated feed mechanism may first load the battery plates into the battery plate separator apparatus from the side, instead of from above. This may be referred to as "side-loading". In such embodiments, the work surface may be coupled to an arm pivotable around an axis between a substantially horizontal and a substantially vertical position. The battery plate separator apparatus may comprise two opposing blocks provided at opposite sides of the work surface. The opposing blocks may be moveable in use between a retracted position and an operational position, such that in use in the operational position the blocks contact the side edges of the battery plates. When the arm and work surface are in the vertical position, the blocks may be moved from the retracted position to the operational position to clamp the battery plates.

After clamping the stack of battery plates, the arm may be rotated from the substantially vertical position to the substantially horizontal position. The work surface may also be moved from a substantially vertical position into a substantially horizontal position, preferably an inclined position. The blocks may then release the stack of battery plates and drop them onto the inclined work surface as before.

Following the vertical displacement, step (b) may include displacing the plates of the at least one stack of battery plates relative to each other in a generally horizontal direction.

Step (b) may include displacing the battery plates in a substantially horizontal direction. Step (b) may further include displacing the plates in an opposite horizontal direction.

There may be a step (c1) which includes splitting the stack of battery plates into two smaller stacks if the dimensions of the stack are found to exceed set specified values.

Step (d) may include, in some embodiments, pivoting the arm from the substantially horizontal position to the substantially vertical position to remove the one or more stacks from the battery plate separator apparatus for further processing.

According to a further aspect of the present invention, there is provided a robot head arrangement for transferring stacks of battery plates, the head comprising a plurality of grippers, each gripper comprising a pair of opposed gripping members arranged in a substantially parallel alignment and an actuator for displacing at least one of the gripper members towards the opposing member.

The robot head may comprise a pair of grippers arranged on opposing sides of the head. The grippers may be controlled by independent actuators.

According to a further aspect of the present invention, there is provided a pallet for the supply of battery plates, the pallet comprising at least one surface for receiving a plurality of stacks of battery plates, wherein the surface of the pallet is provided with a ribbed profile.

The ribs may help with pre alignment of the battery plates.

The ribs may extend substantially parallel to one of the sides of the pallet. The ribs may be defined by a plurality of parallel square profiled grooves. The ribs may comprise a plurality of equally spaced bars extending across a length or width of the pallet.

According to a further aspect of the present invention, there is provided a pallet for the supply of stacks of battery plates with an apparatus as described above, the pallet comprising a surface including at least one indicator for the alignment of the or each stack of plates.

The ribs may allow, allow the gripper members to be positioned relative to the stack so as to pick the stack from the pallet and may be used as datum points by the automated transfer member.

The pallet may have a ribbed upper surface. The ribbed upper surface may include with parallel grooves which aid alignment and also aid pick up. The pallet may have predesignated positions for stacks marked. The pre-designated positions could be different for different types/sizes of plate. The pallet may have at least one datum, for example a corner post.

The pallet may be coupled to a turnover unit for monitoring the orientation of the stacks on the pallet in use. The turnover unit controls a gripper arm which picks up any stacks oriented differently to the others and re-orients it to match the other stacks.

According to a further aspect of the present invention, there is provided a system for separating battery plates, the system comprising:

a pallet for the supply of battery plates;

a battery plate separator apparatus for receiving the stack of battery plates;

a robot, having a head arrangement for transferring stacks of battery plates; and a supply mechanism for transferring a separated stack of plates for subsequent processing.

The pallet, turnover unit, battery plate separator apparatus, robot head arrangement, and supply mechanism may be substantially as described herein.

Whilst the invention has been described above, it extends to any inventive combination of features set out above or in the following description or drawings.

BRIEF DESCRIPTION OF THE DRAWINGS

Specific embodiments of the invention will now be described in detail by way of example only and with reference to the accompanying drawings in which:

FIG. 4b is a schematic cross-sectional view through FIG. 4a;

FIG. 5b is a schematic cross-sectional view through FIG. 5a;

FIG. 6b is a schematic cross-sectional view through FIG. 6a;

DESCRIPTION OF AN EMBODIMENT

Figure 1:
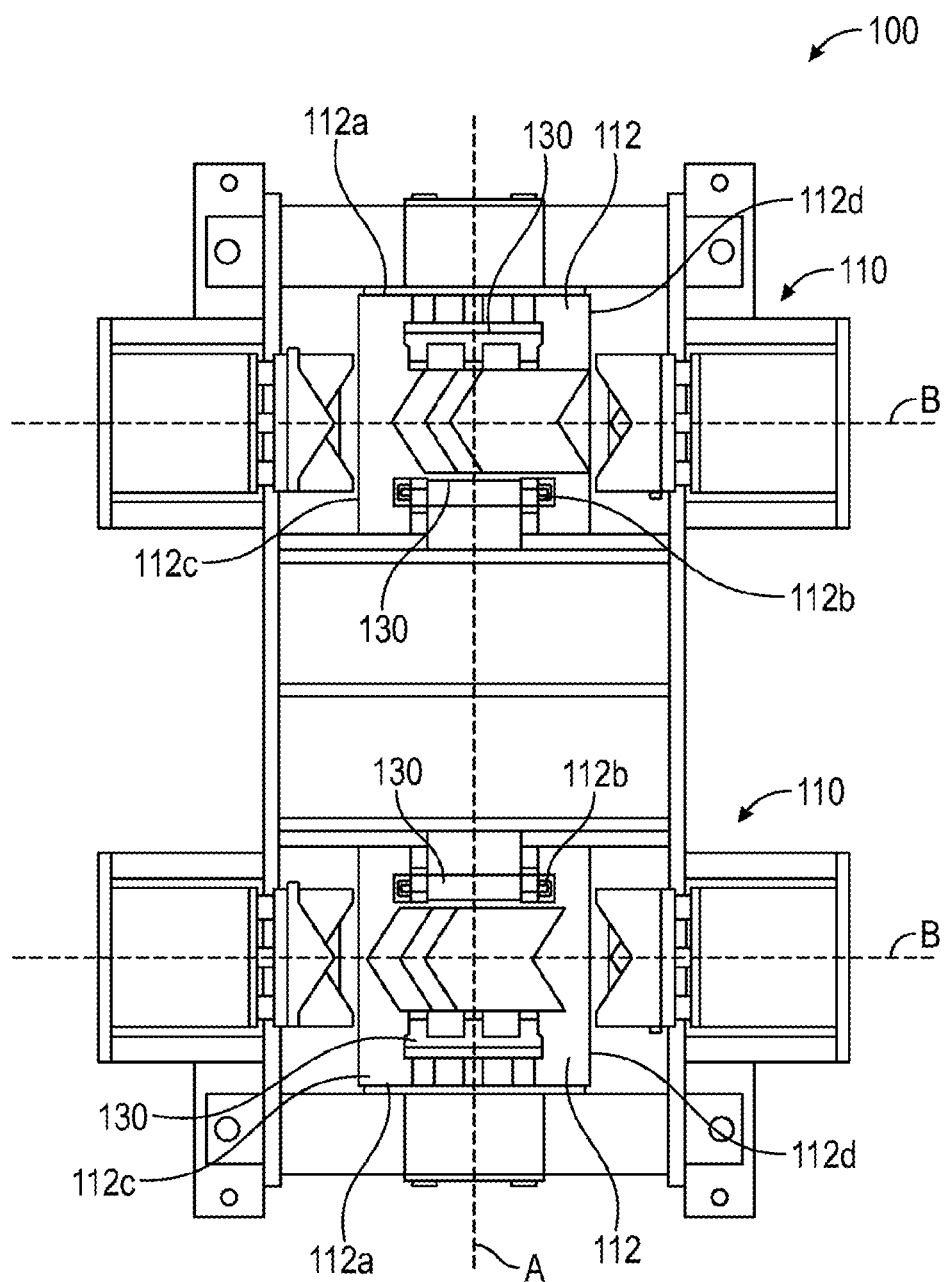
FIG. 1 is a schematic representation of a plan view of an apparatus for separating battery plates according to an embodiment of the invention.

FIG. 1 shows a plan view of an apparatus 100 for separating battery plates according to an embodiment of the invention.

The apparatus 100 for separating battery plates, also referred to as a battery plate separator 100 includes two work stations 110. Each work station 110 includes a platform 112 having essentially flat upper surface 114 configured to receive a stack of battery plates 10. In use, the battery plates 10 are aligned with upper edges having tabs 12 facing upwards (shown, for example in FIG. 4b) and their lower edges 14 resting on the upper surface 114.

Figure 2:
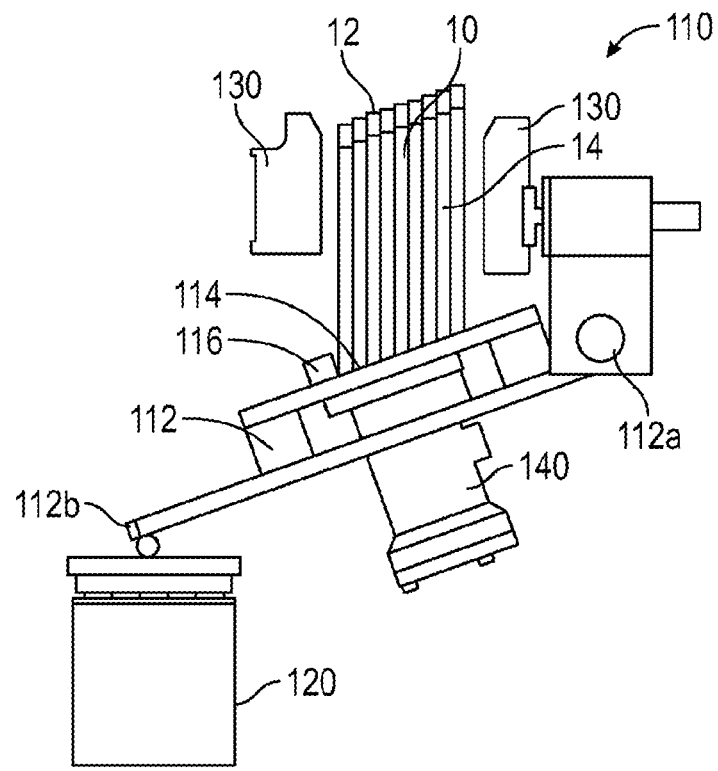
FIG. 2 is a schematic cross-sectional view, taken through line A, of a work station of the apparatus of FIG. 1, with the platform in an inclined position.
Figure 3:
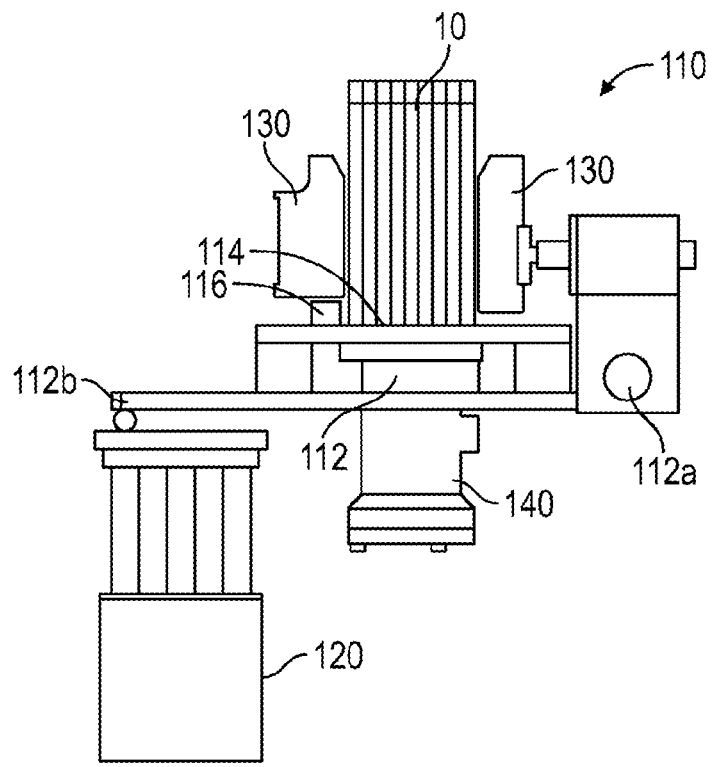
FIG. 3 is a schematic cross-sectional view, taken through line A, of a work station of the apparatus of FIG. 1, with the platform in a substantially horizontal position.

Each work station 110 is provided with an actuator 120, which is operable to move the platform 112 between an inclined orientation (shown in FIG. 3) and a substantially horizontal orientation (shown in FIG. 3). In the embodiment shown, the platform 112 is pivotable about an axis provided towards a first side 112a of the platform 112, and an actuator 120 is provided at a second opposite side 112b. The second edge 112b of the platform is moved up and down by the actuator 120 as it moves between an extended (FIG. 2) and a retracted position (FIG. 3). A stop 116 is provided on the upper surface 114 towards the side 112b. The stop 116 acts to prevent the stack of battery plates 10 sliding off the surface 114 or moving out of essentially vertical alignment.

In other embodiments (not show), the platform is pivotable about a central axis, and actuator(s) are provided on one or both sides of the central axis. It will be appreciated that any suitable actuating mechanism can be provided which is operable to move the platform.

Each work station 110 also includes two guides 130, provided above the first and second sides of the platform, the guides 130 having essentially flat vertical inward facing surfaces, which act to guide the stacks of battery plates 10 onto the upper surface 112. It will be appreciated that the separation of the guides 130 can be adjusted as required, depending on the size of stack to be processed, i.e. the number of battery plates within a stack to be separated. The guides 130 move inwards when the platform is moved into its horizontal (as shown in FIG. 3) to provide vertical support to the battery plates during further operation of the apparatus (described in detail below). In an alternative embodiment (not shown), the guides can be fixed during operation of the work station.

Each work station 110 includes an agitator 140, which is operable to vibrate the platform 112.

Each work station 110 is provided with a first displacement mechanism 150, a second displacement mechanism 160 and an alignment mechanism 170. In the embodiment shown, these mechanisms are all provided along the axis B on third 112c and fourth 114d sides of the platform 112.

Figure 4A:
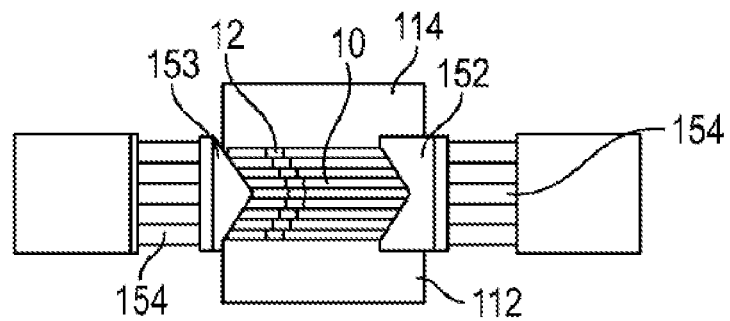
FIG. 4a is schematic plan view of a work station of the apparatus of FIG. 1 with a first displacement mechanism in its operational position.
Figure 4B:
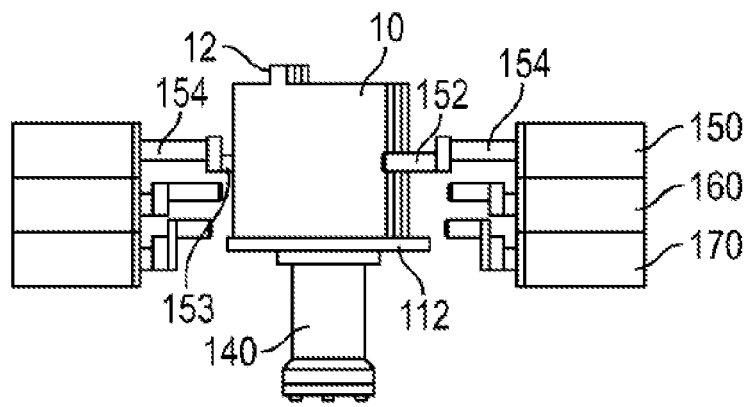
Figure 5A:
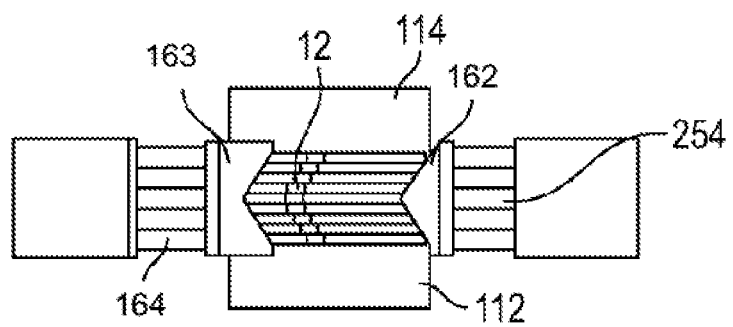
FIG. 5a is schematic plan view of a work station of the apparatus of FIG. 1 with a second displacement mechanism in its operational position.
Figure 5B:
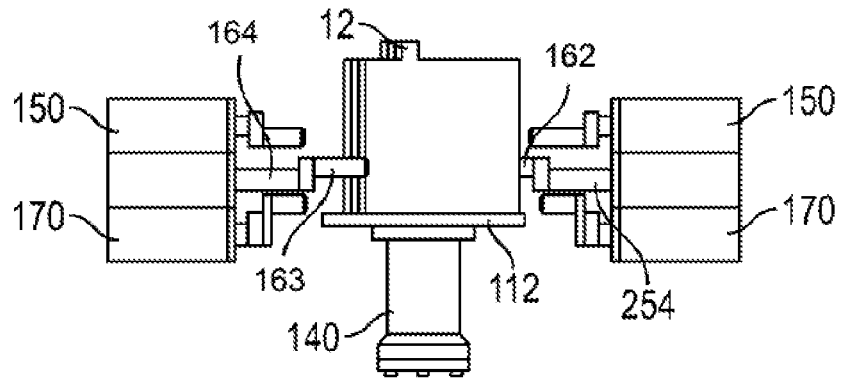

As can be seen in FIG. 4a, the first displacement mechanism 150 includes first and second opposing blocks or jaws 152, 153 which are moveable between an operational position (FIGS. 4a and 4b) and retracted position (for example in FIG. 5b). The first displacement mechanism 150 includes an actuator 154 for moving the blocks 152, 153. The first and second opposing blocks 152, 153 have opposing surfaces, which face the side edges of the battery plates loaded onto the work surface 112. The first block 153 has a projecting arrow head profile and the second block 152 has a corresponding concave arrow head shaped profile.

As can be seen in FIG. 5a, the second displacement mechanism 160 includes third and fourth opposing blocks or jaws 162, 163 which are provided below first and second blocks (of the first displacement mechanism). The first and second blocks which are moveable between an operational position (FIGS. 5a and 5b) and retracted position (for example, FIG. 4b). The mechanism 160 includes an actuator 164 for moving the blocks 162, 163. The third and fourth opposing blocks 162, 163 have opposing surfaces, which in use face the side edges of the battery plates loaded onto the work surface 112. The third block 162 has a concave arrow head shaped profile and the fourth block 162 has a corresponding projecting arrow head profile.

Figure 6A:
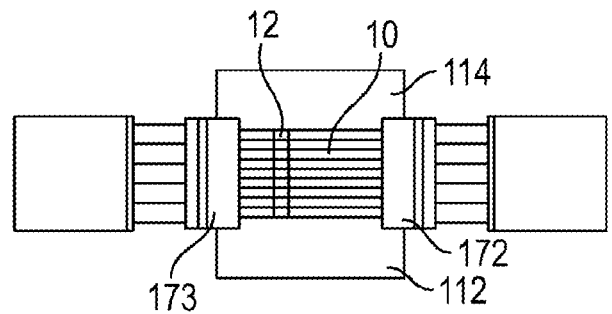
FIG. 6a is schematic plan view of a work station of the apparatus of FIG. 1 with a third displacement mechanism in its closed position.
Figure 6B:
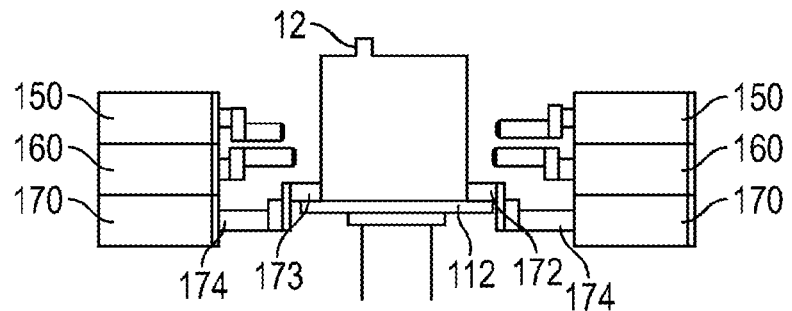

As can be seen in FIG. 6a, the alignment mechanism 170 includes a pair of blocks 172, 173 having opposing flat surfaces, which in use face the side edges of the battery plates in the stack 10. The alignment blocks 172, 173 are provided below the second displacement mechanism 160. The alignment blocks 172, 173 are moveable between an open position (FIG. 4a) and a closed position (FIGS. 6a and 6b) in which the blocks are spaced apart by a distance substantially equal to a battery plate width. As the alignment blocks 172, 173 move to the closed position, the battery plates in the stack 10 are pushed into alignment.

Figure 7:
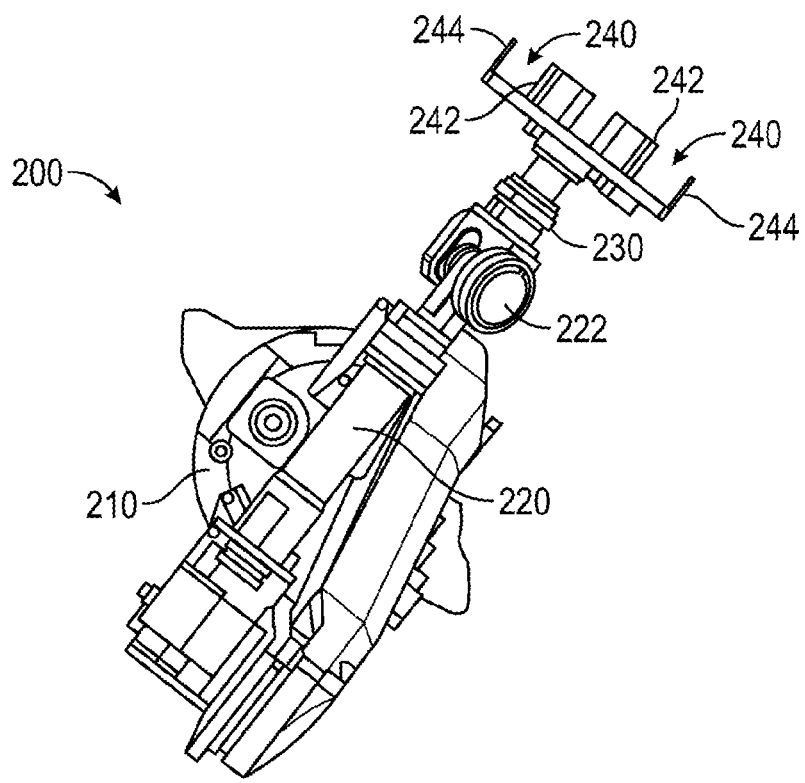
FIG. 7 is a plan view of a feed mechanism according to an embodiment of the invention.
Figure 8A:
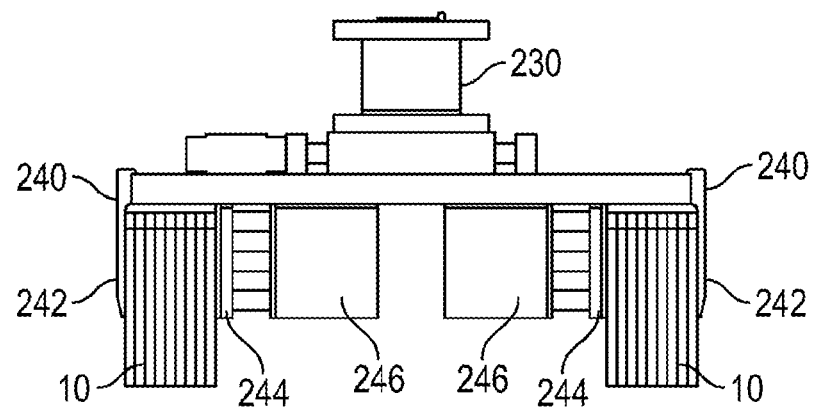
FIGS. 8a, 8b and 8c are schematic side views of the feed mechanism of FIG. 7 in operational positions.
Figure 8B:
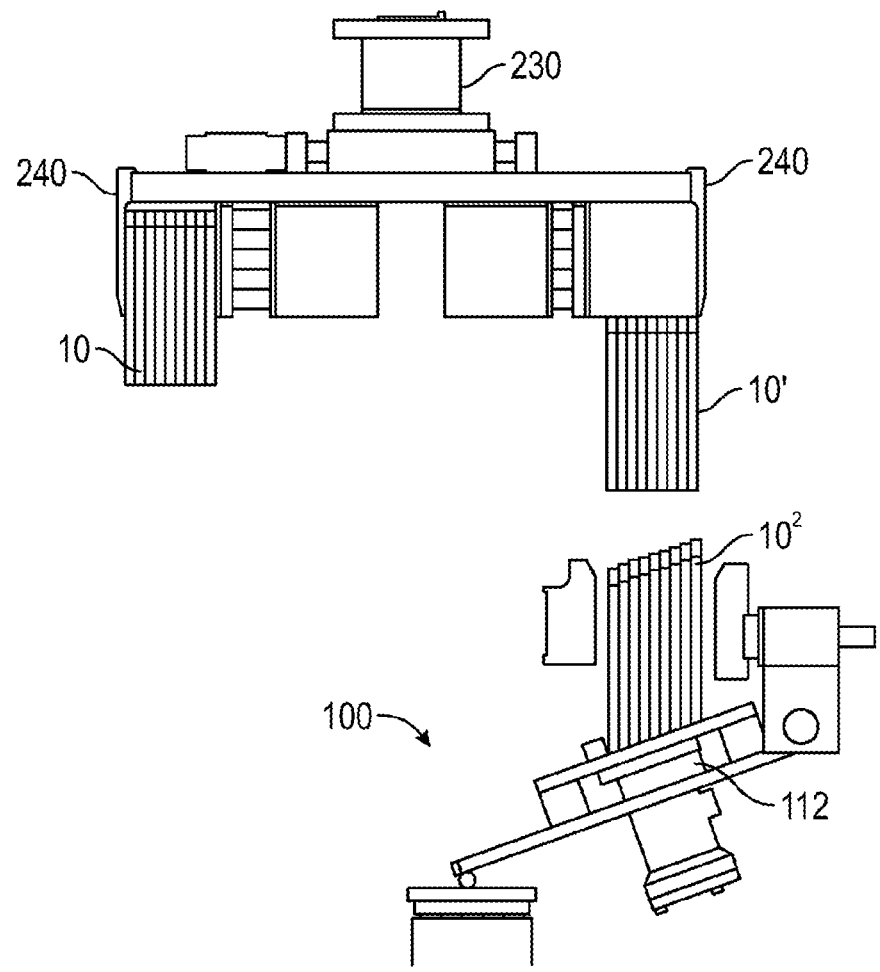
Figure 8C:
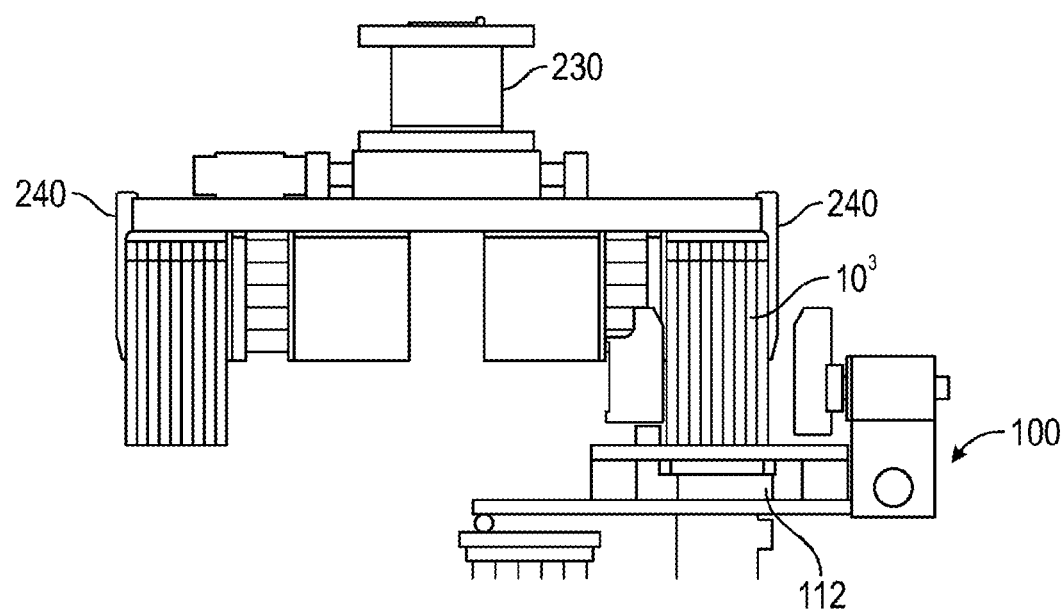

FIGS. 7 to 8c show a robot 200 which can be used to load the battery plate separator 100 described above.

The robot 200 is an articulated arm 202 having a lower section 220 and an upper section 230. The upper section 230 is rotatably attached to the lower arm 220 at 222. The robot 200 is rotatable about a base 210.

The upper section 230 includes an arm 232 and a head 230 having two grippers 240. Each gripper 240 includes a pair of opposed gripping members 242, 244 arranged in a substantially parallel alignment. Each gripper 240 includes an actuator 246 for displacing an inner gripper member 242 towards an opposing, outer gripper member 244. The inner gripping member 242 is moveable between a closed orientation, in which the gripping members securely hold a stack of battery plates 10, and an open orientation. The separation of the gripping members in the closed orientation can be programmed as necessary depending on the size of stack to be processed. Each gripper member comprises a pair of spaced jaws (not shown in figures).

Figure 9:
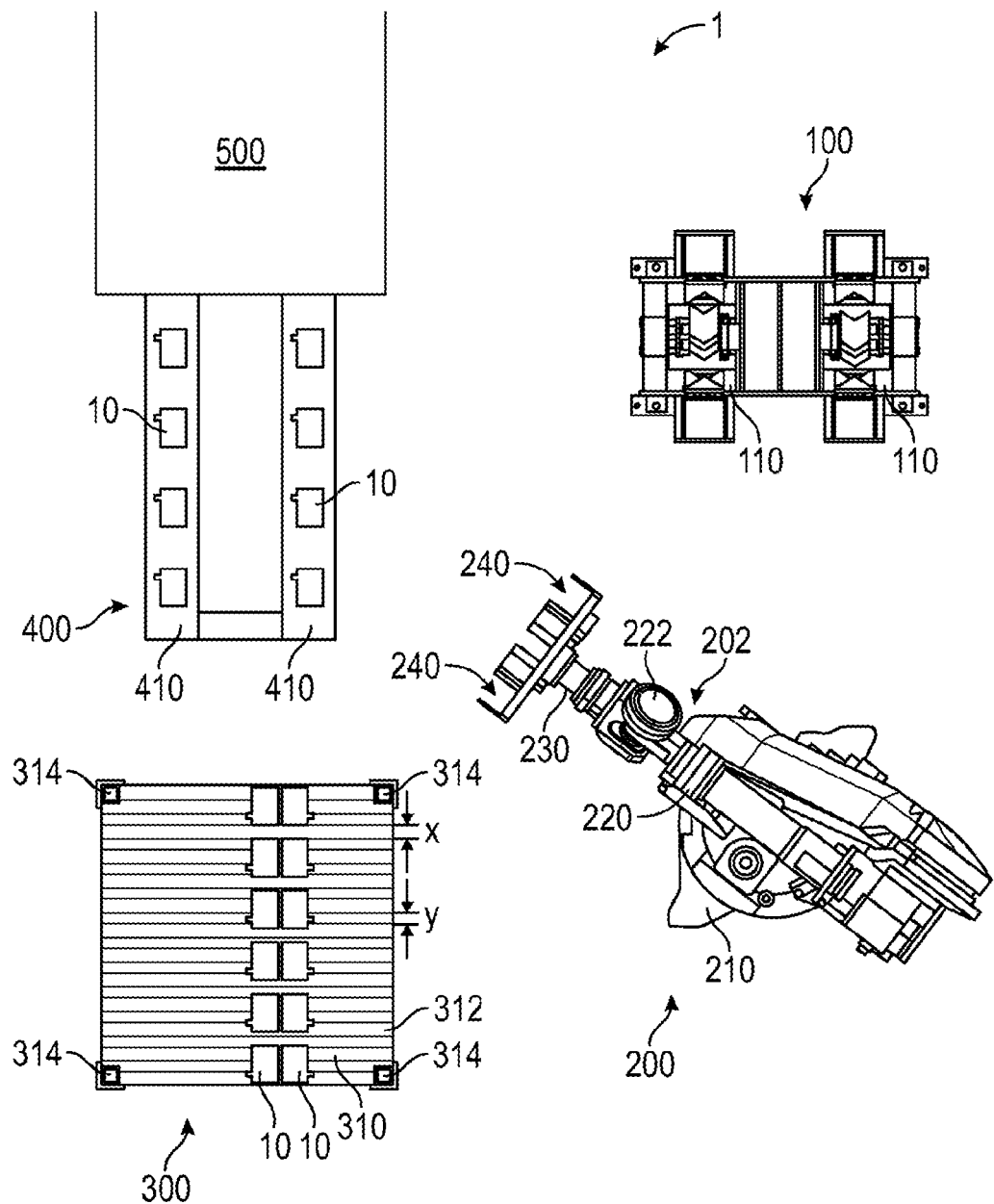
FIG. 9 is a schematic plan view of an apparatus for manufacturing battery plates according to an embodiment of the invention.

FIG. 9 shows an apparatus 1 for manufacturing battery plates, including the plate separator 100, the robot 200, a pallet 300, a conveyor apparatus 400 and a further processing station 500.

In the embodiment shown, the pallet 300 includes a base 310 having a ribbed upper surface. In this embodiment the ribbed upper surface is formed by parallel cross beams 312 extending across a width or length. The cross beams 312 each have a width x are spaced apart by a distance y. The dimensions x and y are determined by the size and number of the robot gripper member, so that in use one gripping member (of an opposing pair) can be inserted into the grove/space under a stack and the pair of gripping members closed to pick the stack from the pallet.

In an alternative embodiment of a pallet (not shown), the ribbed surface is formed by parallel grooves formed in a solid surface.

In use, stacks of battery plates 10 are loaded onto the pallet 300 following the curing process. In FIG. 9, two rows of battery plate stacks 10 are shown loaded on the pallet. The stacks 10 are positioned so as to be aligned with the cross beams 312 such that the gripper mechanisms can be inserted into the grooves or spaces under each stack, allowing the gripper jaws to close around the stack.

In the embodiment the pallet has a generally square form. However it will be appreciated any suitable shape of pallet can be used, since the robot can be programmed as necessary using the datum points (corner posts and/or ribbed upper surface) to pick up the loaded stacks.

The conveyor apparatus 400 includes two conveyor belts 410 provided side by side, which extend in a generally horizontal plane. The belts 410 carry stacks of battery plates to a further processing station 500, which could be for example an enveloping machine. The conveyor apparatus 400 includes at least one cut out (not shown) under the upper section of the belt at a loading position. The cut out(s) have dimensions corresponding to the jaw(s) of the robot gripper mechanism to allow the robot to place the separated stacks of battery plates onto the conveyor belt.

In use the robot 200 rotates about its base 210 to a position adjacent to the pallet 300. The upper section 230 rotates about the point 222 to align one of the gripper mechanisms with a stack 10 on the pallet 300. The robot moves into position, the gripper mechanism 240 closes around the first stack 10 and removes the stack from the pallet. The upper section rotates 180 degrees and the arm moves to align the other gripper mechanism 240 with a second stack 10 on the pallet 300. Once the robot 200 has picked up the second stack 10 (as shown in FIG. 8a), it rotates about its base 210 to a position adjacent to the battery plate separator 100.

The robot 200 moves to position, such that each gripper 240 is positioned above the platform 112 of a work station (shown in FIG. 8b). At this stage, the platform 112 of the work station 100 is in its inclined position and the stops 130 are open. The gripper mechanism 240 opens, thereby releasing the stack which drops down onto the work surface 114. In FIG. 8b, reference $10^1$ shows the stack falling. The plates within the stack fall essentially vertically until they impact on the work surface (shown by reference $10^2$). Since the work surface 114 is inclined, the battery places move downwards by different amounts with the plate closest to the stop 116 moving furthest (FIG. 8b and FIG. 2). This means that the battery plates displace vertically with respect to their adjacent plate(s). This shearing action breaks some or all of the bonds created between plates during curing and separates the plates.

The platform 112 is then moved to its horizontal position (shown in FIGS. 3 and 8c) and the stops 130 are moved inwards. The agitator 140 operates to vibrate the platform 112.

Once the platform 112 is in its horizontal position, the first displacement mechanism 150 is operated. The first and second blocks 153, 152 move to their operational position to displace the battery plates in the stack relative to each other in a first, essentially horizontal or lateral direction (FIGS. 4a and 4b); and are then retracted. Then the second displacement mechanism 160 is operated operates to displace the plates relative to each other in an opposite lateral direction (FIGS. 4a and 4b). Finally, the alignment mechanism 170 operates to push the battery plates back into alignment to form a neat stack.

With regard to the two work stations, it will be appreciated that the robot 200 may drop both stacks of battery places simultaneously onto respective platforms 112, or the robot 200 may drop the stacks sequentially. The work stations may operate simultaneously, or independently.

As shown in FIG. 8c, once stacks of aligned, separated battery plates (shown by reference $10^3$) have been formed on the work stations 112, the robot 200 picks up the two stacks. It rotates about its base to a third position adjacent to the conveyor apparatus 400 and places a stack on each conveyor belt 410.

Whilst a robot with two gripper mechanisms has been described, it will be appreciated that alternative feed arrangements can be provided for use with the battery plate separator. For example the feed mechanism could be a single robot having one gripper mechanism or multiple robots (for example two) each having a single gripper mechanism. Alternatively, a feed mechanism could be provided for moving the stacks from the pallet to the battery plate separator, and a different transfer mechanism could be provided for moving the stacks from the battery plate separator to the next work station.

FIGS. 10a-10d show an apparatus 600 for separating battery plates according to a further embodiment of the invention. Where the features are the same as in previous figures, those features are given the same reference numeral except preceded with a "6".

Figure 10A:
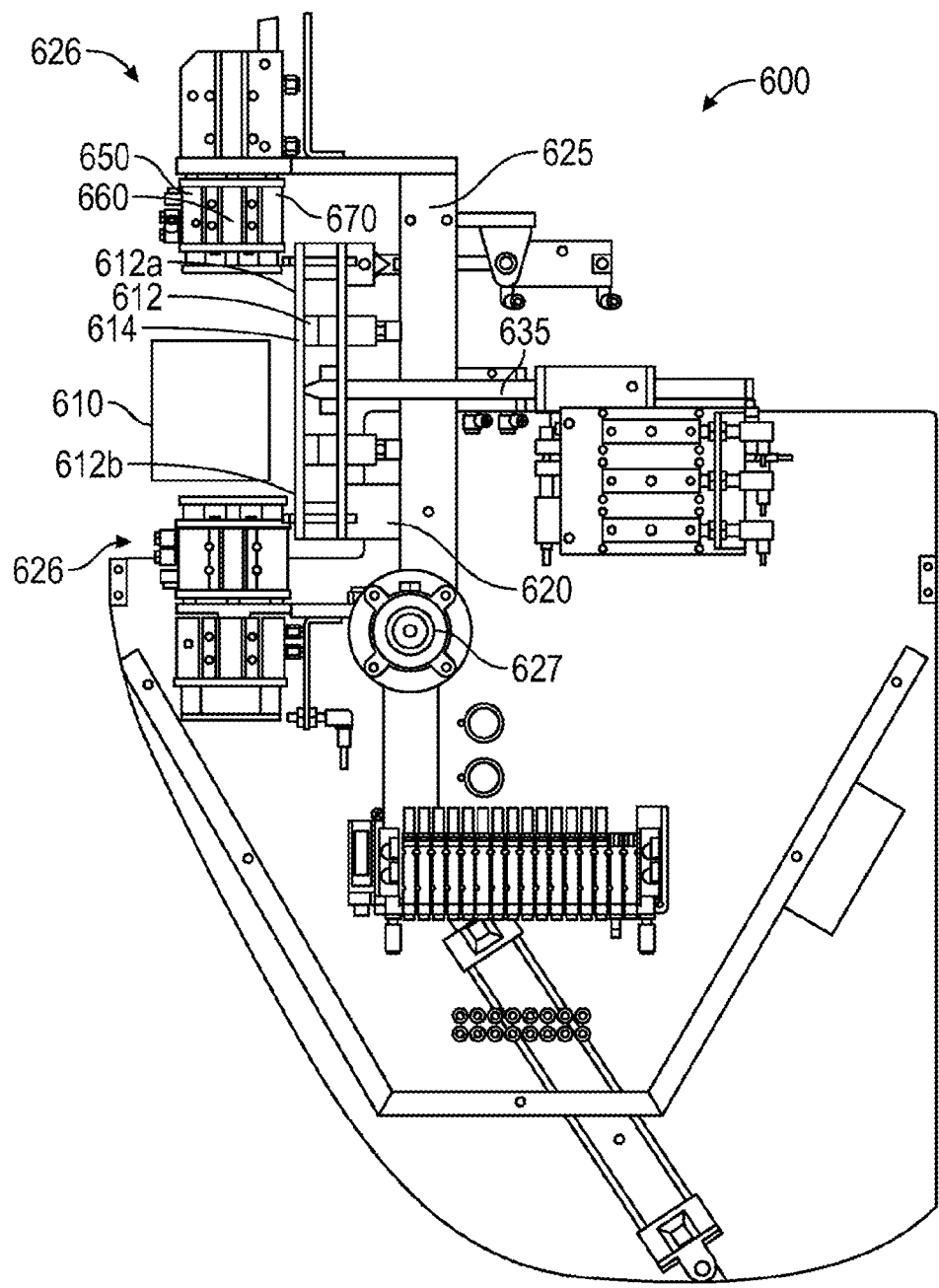
FIGS. 10a-10d are schematic side views of an apparatus for separating battery plates according to a further embodiment of the invention.
Figure 10B:
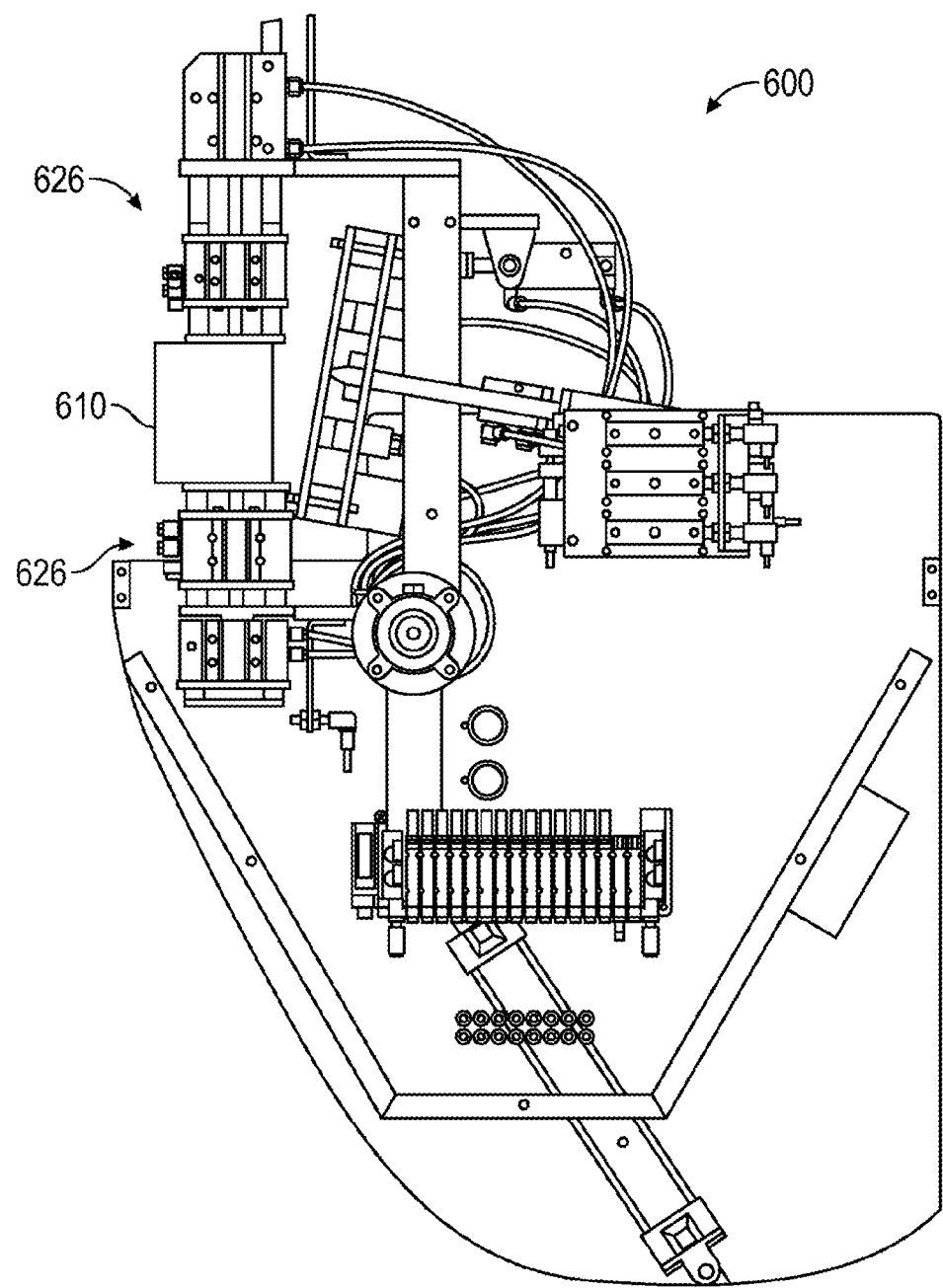
Figure 10C:
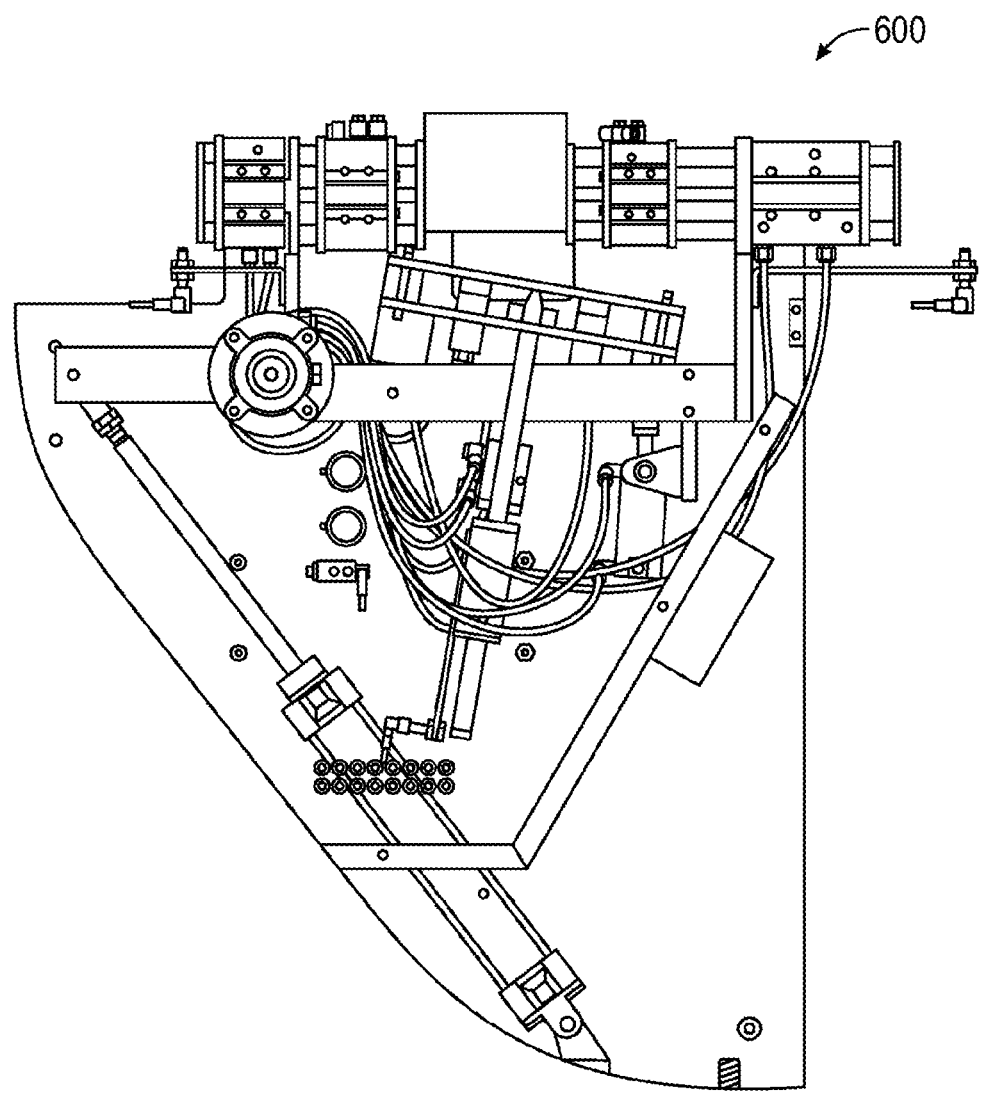
Figure 10D:
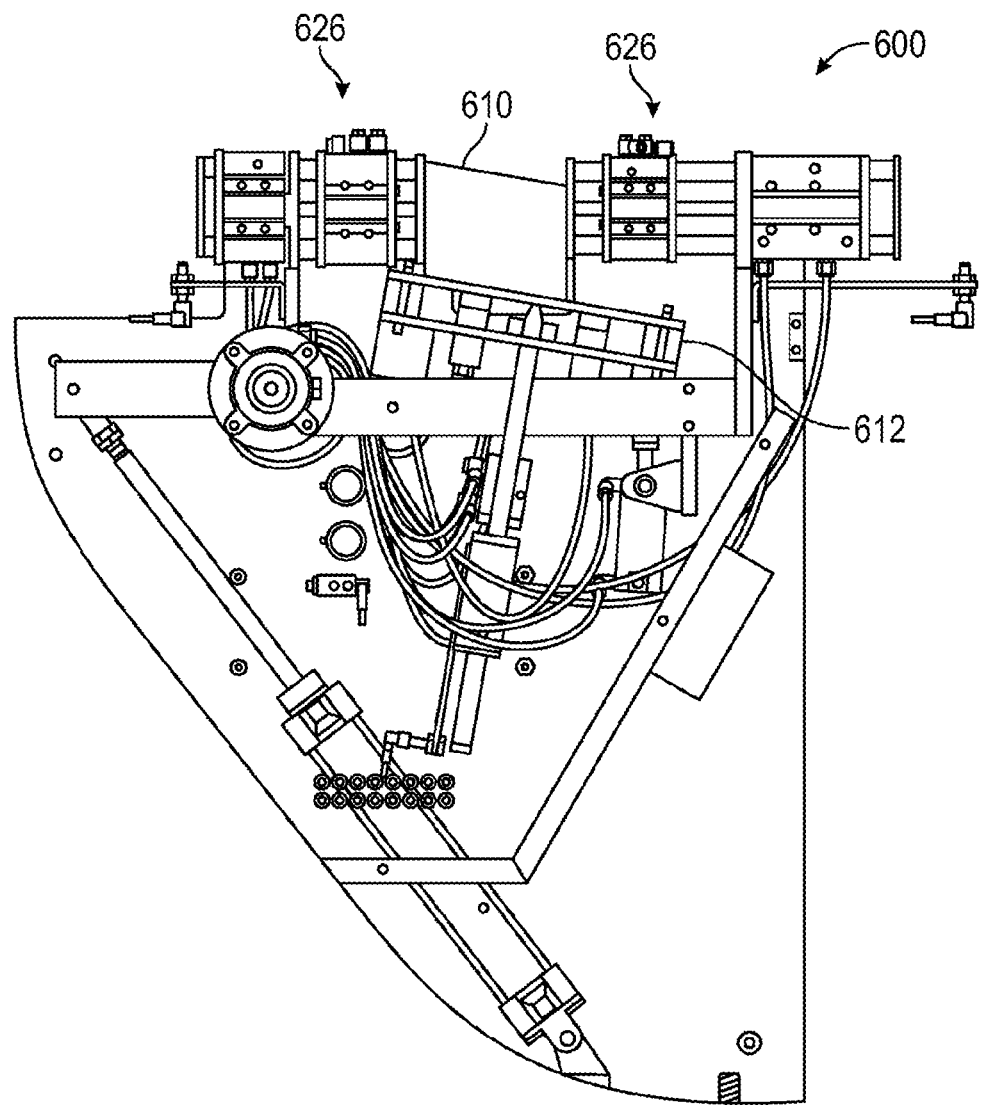

The work surface 612 is coupled to an arm 625. The arm 625 is pivotable around an axis 627 between a substantially vertical (FIGS. 10a-b) and a substantially horizontal position (FIGS. 10c-d). FIGS. 10a and 10b show the work surface 612 being pivotable with respect to the arm 625 between a position substantially aligned with the vertical plane (FIG. 10a), and a position angled with respect to the vertical plane (FIG. 10b).

The apparatus 600 further comprises a splitting mechanism 635, which will be described in more detail in FIGS. 11a and 11b.

In use, a stack of battery plates 610 are loaded into the apparatus 600 when the arm 625 is in the vertical position, as shown in FIG. 10a. The stack of battery plates 610 are loaded into the apparatus using the robot 200 as described above with respect to FIGS. 7 to 8c. The battery plates 610 are supplied via a pallet 300, as described above.

The stack of battery plates 610 are positioned next to the work surface 612, and aligned such that the side edges of the plates 610 face the work surface 612. The stack of battery plates 610 is then clamped in place, as shown in FIG. 10b, by opposing blocks 626 in the operational position. The opposing blocks 626 comprise a first displacement mechanism 650, a second displacement mechanism 660 and an alignment mechanism 670.

Whilst the arm 625 is in the vertical position, the work surface 612 is pivoted with respect to the arm 625 from the position substantially aligned with the vertical plane to the position angled with respect to the vertical plane. The arm 625 is then pivoted around pivot point 627 from the vertical position to the horizontal position, as shown in FIG. 10c. In this position, the opposing blocks 626 are retracted slightly to release the stack of battery plates 610 such that they may fall onto the inclined work surface 612 to vertically displace adjacent battery plates relative to each other. The stack of battery plates are now in the same configuration as shown in FIG. 2, and the plate separation process continues as described in FIGS. 2-6b.

Figure 11A:
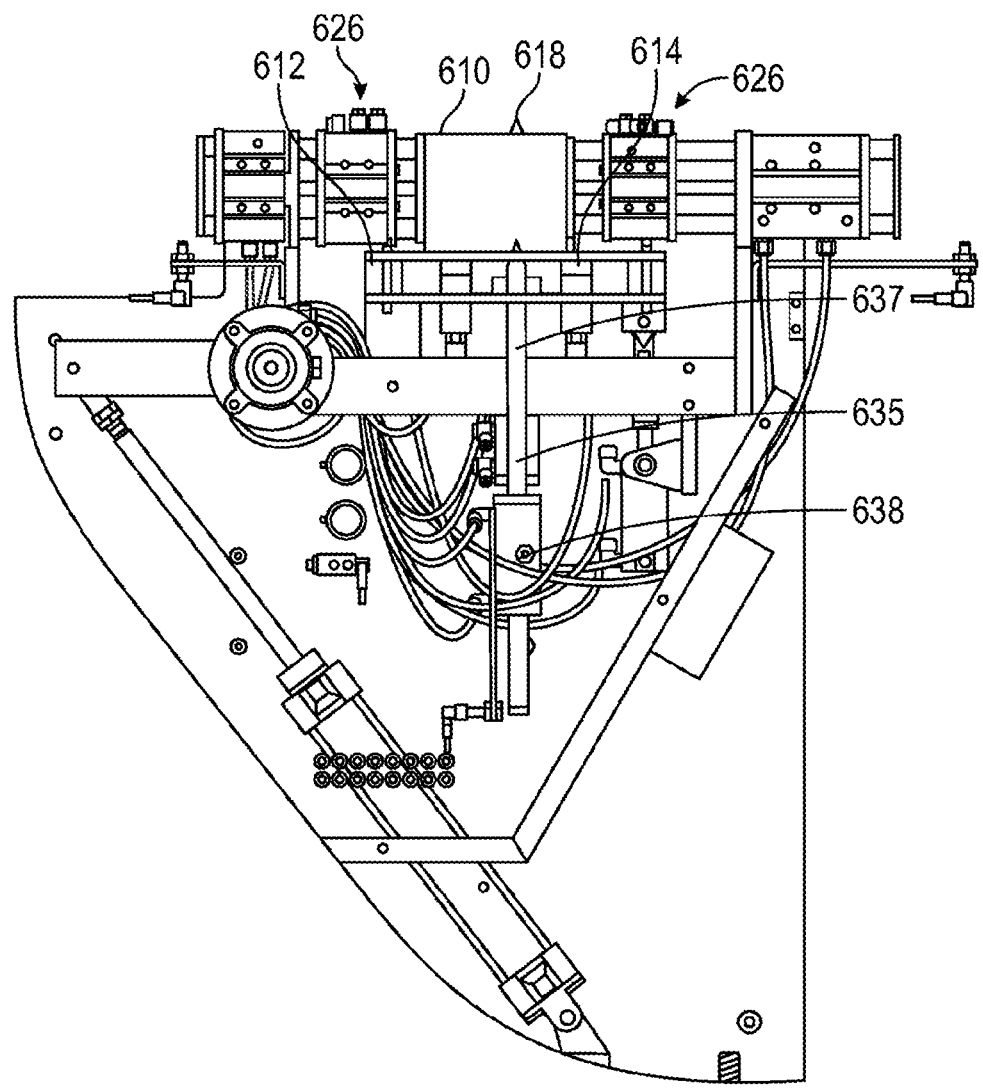
FIGS. 11a and 11b are schematic side views showing the splitting mechanism dividing a stack of battery plates in two according to an embodiment of the invention.
Figure 11B:
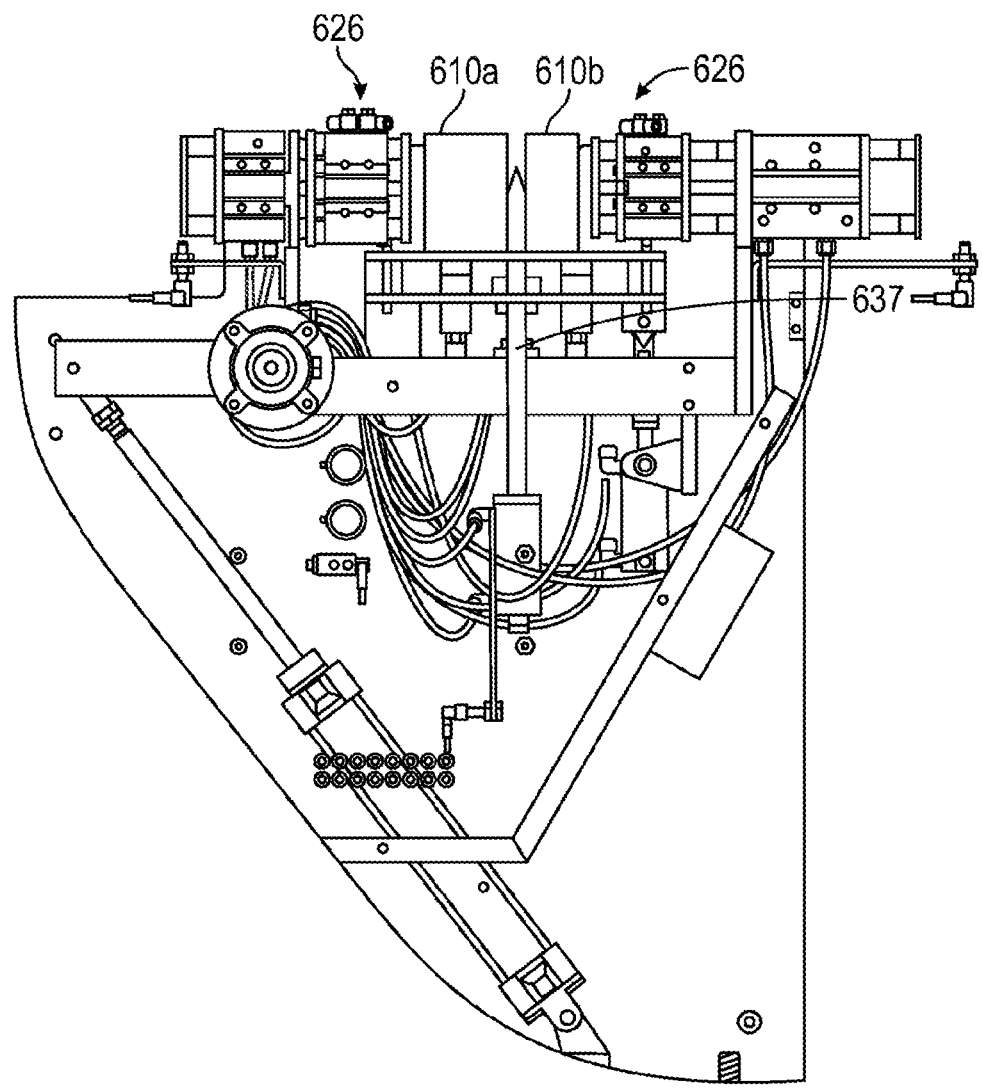

FIGS. 11a and 11b show the splitting mechanism 635 in more detail. The splitting mechanism 635 comprises a pointed or tapered rod 637 coupled to an actuator 638. In a stored position, as shown in FIG. 10a, the pointed end of the rod 637 is below and generally adjacent to the upper surface 614 of the work surface 612. The work surface 612 comprises an aperture in both the upper surface 614 and a lower surface to accommodate the rod 637.

The apparatus 600 comprises a sensor (not shown) to detect the width of the stack of battery plates 610 between the two opposing blocks 626.

In use, if the sensors detect that the width of the stack of battery plates 610 is greater than a required size (for example 150 mm), the actuator 638 is activated and extends the rod 637 upwards through the apertures in the work surface 612 and into the stack 610. FIG. 11a shows the initial contact between the pointed end of the rod 637 and the stack 610 where the rod 637 starts to displace the adjacent plates 618. It will be appreciated that depending upon the required use of the machine (for example whether it is always used to process the same type and size of battery plate) the transverse position of the rod 637 may be adjustable. For example the transverse position could be controlled by an actuator or the transverse position may be selectable during initial configuration of the apparatus.

The rod 637 is extended further upwards into the stack 610 until it is maximally extended (as shown in FIG. 11b). In this position, the stack 610 is divided into two separate stacks 610a, 610b which are both less than 150 mm wide. To accommodate the split stacks 610a, 610b and the rod 637, the opposing blocks 626 release their grip on the stack 610 and move into a partially retracted position thus allowing the two stacks to separate slightly in the lateral direction.

Figure 12A:
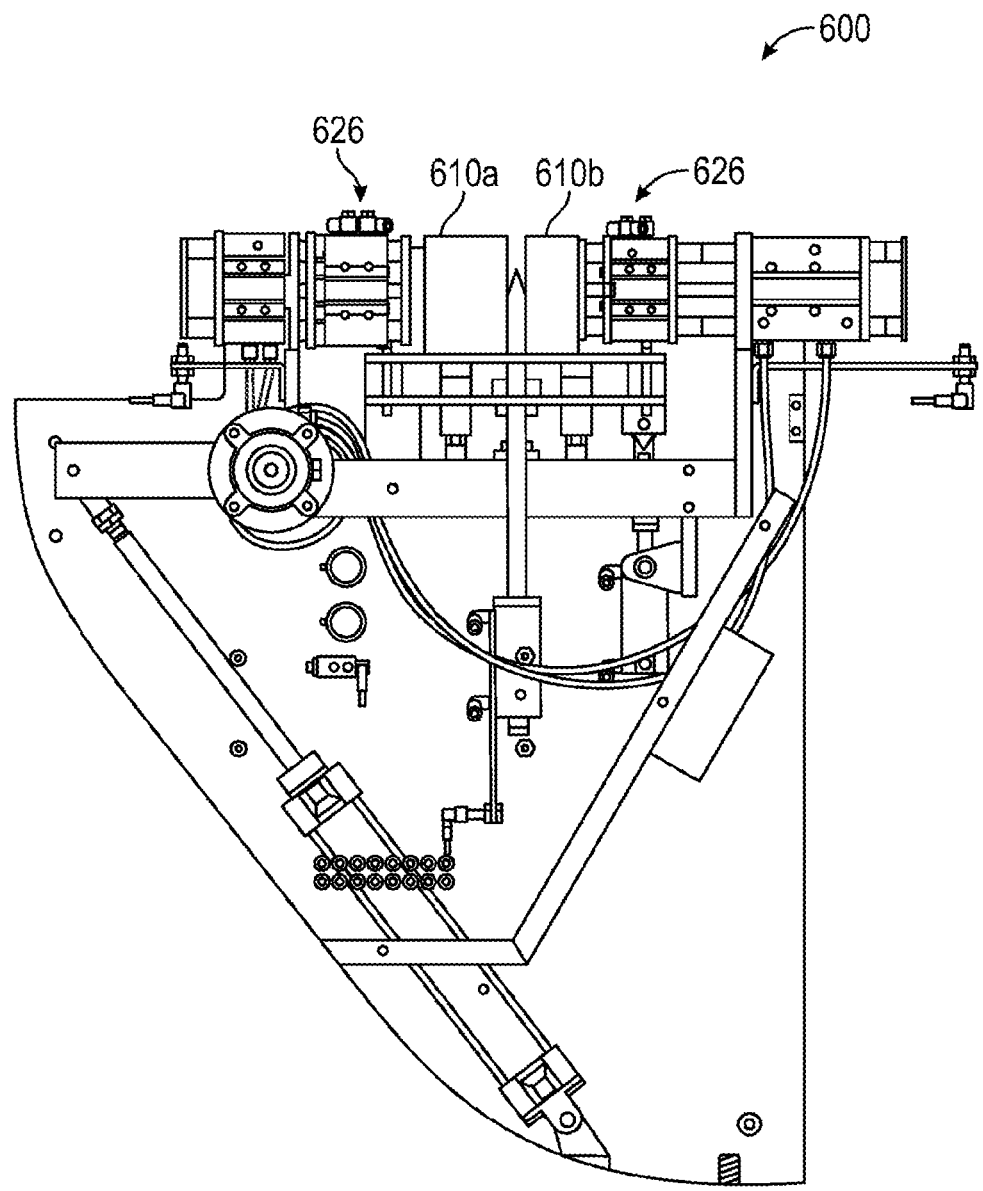
FIGS. 12a-12d are schematic side views of a split stack of battery plates being unloaded from the apparatus according to an embodiment of the invention.
Figure 12B:
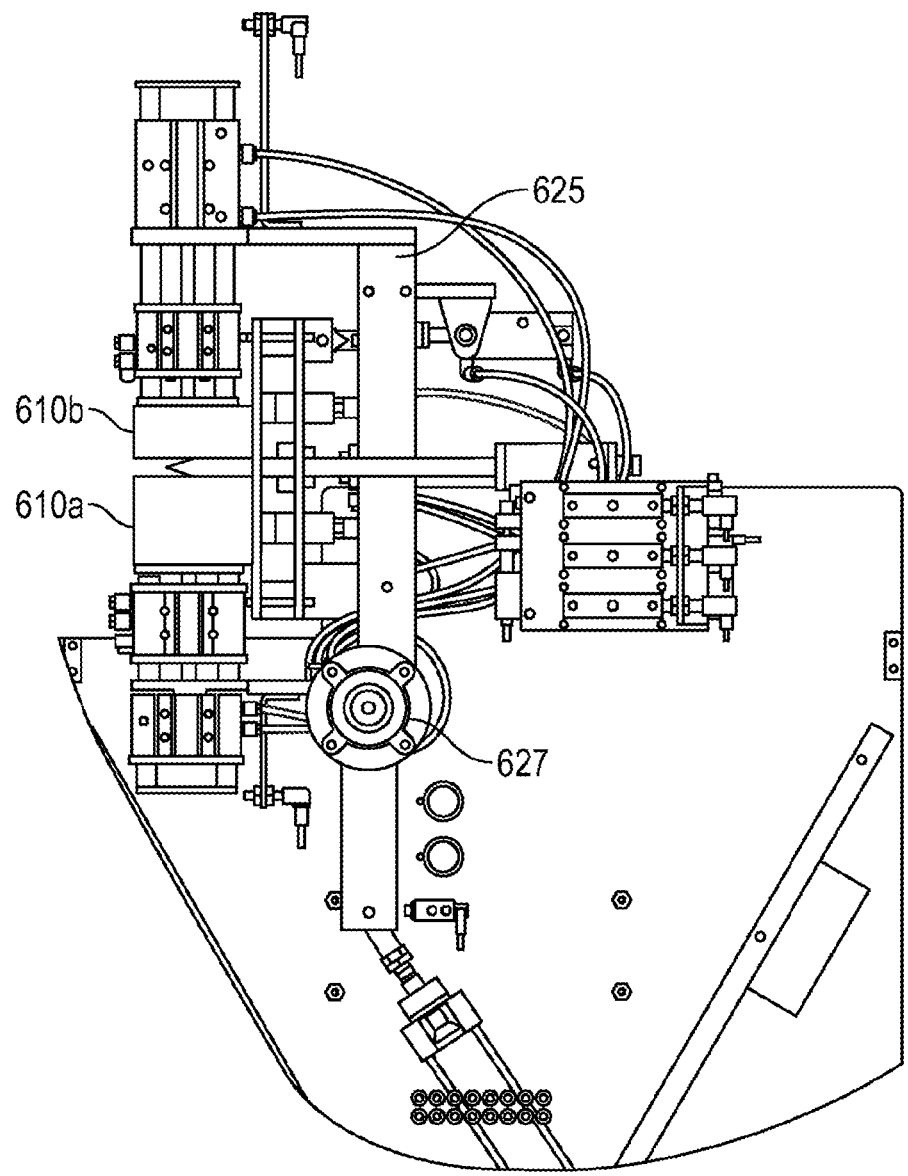
Figure 12C:
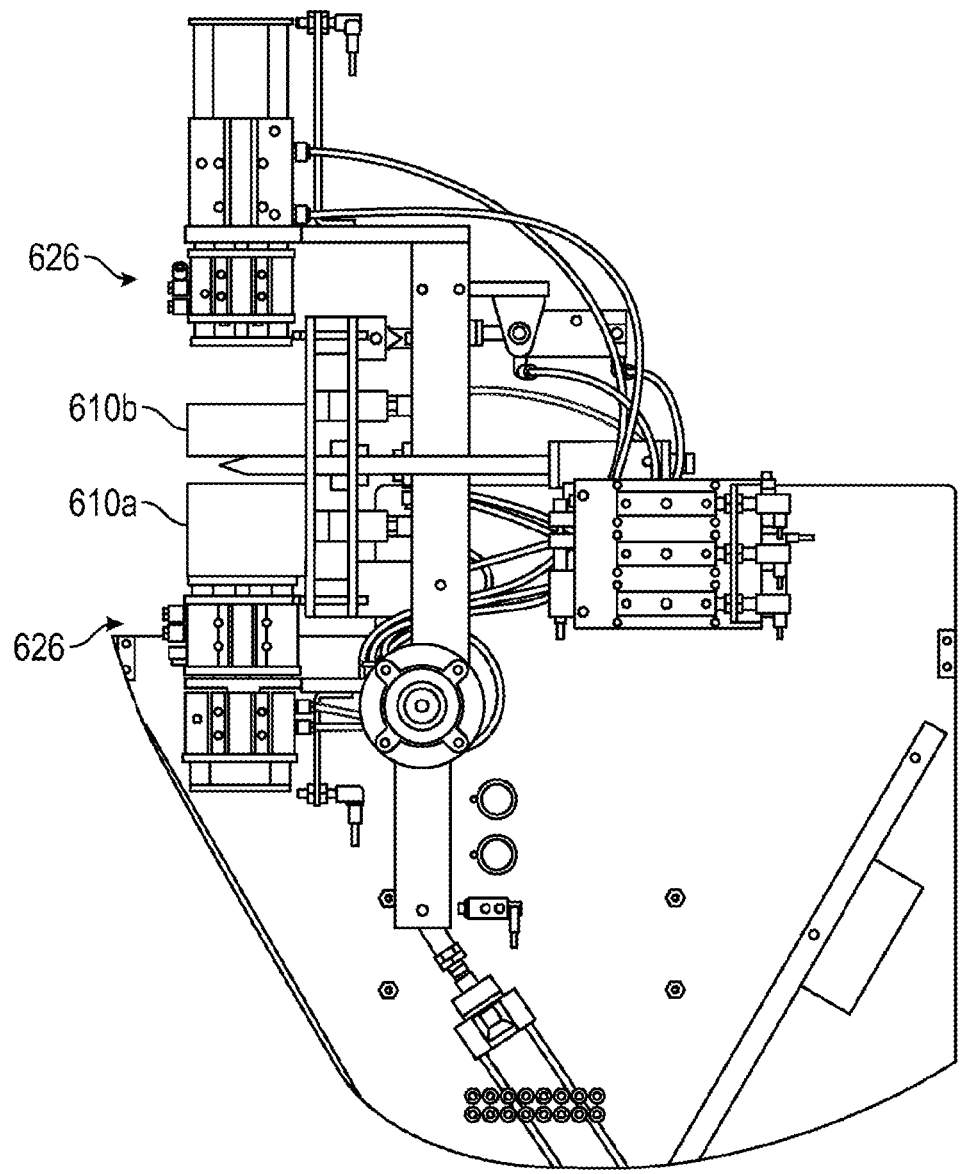
Figure 12D:
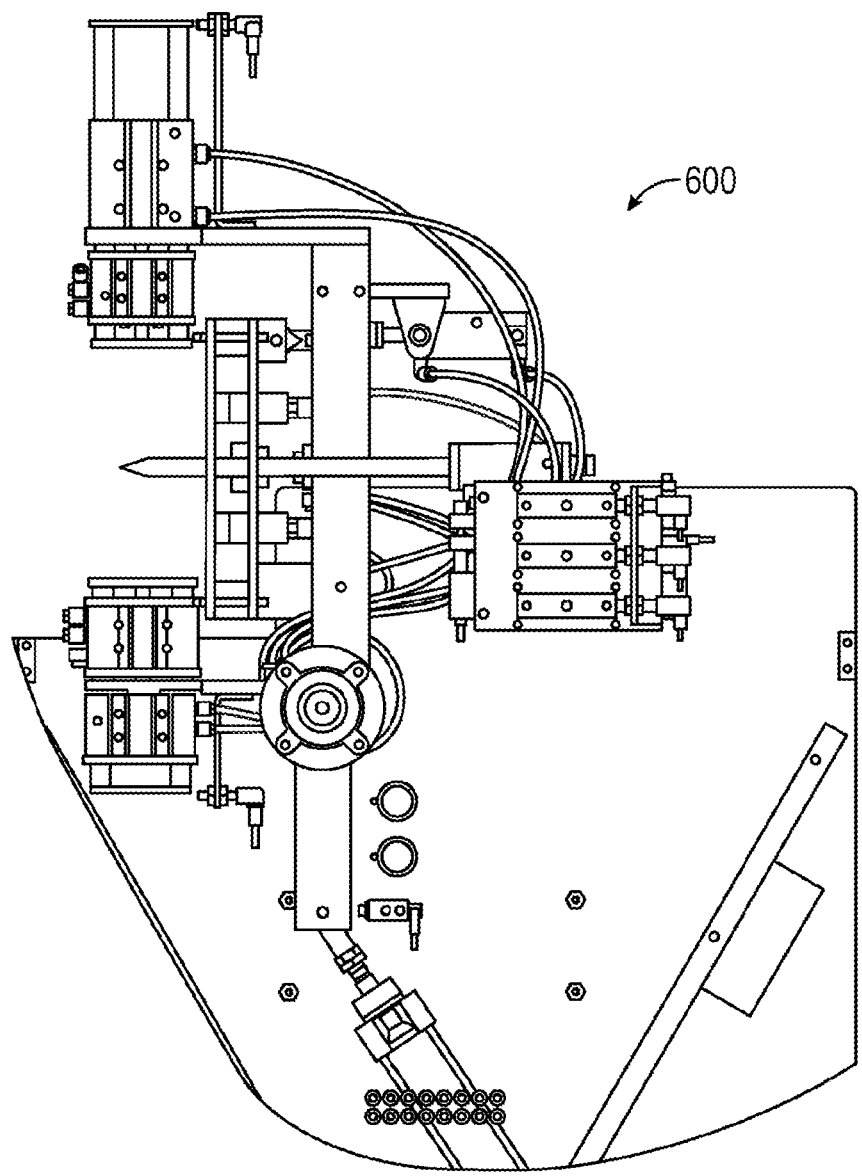

FIGS. 12a-12d show the split stack 610a, 610b being unloaded from the apparatus 600. In use, the opposing blocks 626 once again clamp the stacks 610a, 610b to secure them in place. The arm 625 then pivots around the pivot point 627 from the horizontal position (as shown in FIG. 12a) to the vertical position (as shown in FIG. 12b). The opposing blocks 626 move into a fully retracted position. The stack 610a falls downwards under gravity onto one of the blocks 626, and the stack 610b falls downwards under gravity onto the rod 637. The stacks 610a, 610b can now be unloaded from the apparatus 600 by hand, or alternatively via robot 200. The stacks 610a, 610b are then transferred onwards as described above to further processing station 500.

As the orientation of the unseparated stacks of plates on the pallet may not initially be correct the apparatus may further be provided with a turnover unit. The turnover unit may be a simple mechanism arranged to receive a stack of plates and reverse their orientation. The turnover unit may be associated with a detection system for monitoring the orientation of the stacks on the pallet. The detection system may be associated with a controller which may selectively utilise a gripper arm to direct required stacks to the turnover unit. After being turned by the turnover unit, the stack may be returned to the pallet or loaded into the separating apparatus. The stacks of battery plates may be supplied in one or more rows on the pallet. Preferably, each row of stacks is oriented in the same way on the pallet. If any stacks are found to be oriented differently to the others in that row, a gripper arm may transfer the stack to the turnover unit to re-orients it to match the other stacks in that row. Having all the stacks face in the same orientation helps to ensure the stacks are placed in the battery plate separator apparatus correctly and efficiently.

While the invention has been described above with reference to one or more preferred embodiments, it will be appreciated that various changes or modifications may be made without departing from the scope of the invention as defined in the appended claims.

The invention claimed is:

1. An apparatus for separating battery plates comprising:
   a work surface for receiving a stack of battery plates;
   a first displacement mechanism configured to shear the plates of the stack relative to each other in a first, substantially horizontal, direction, wherein the first displacement mechanism comprises two opposing blocks provided above the work surface, the blocks being moveable between a retracted position and an operational position, such that in use in the operational position the blocks contact opposing side edges of the battery plates; and
   a second displacement mechanism configured to shear the plates of the stack relative to each other in a second, substantially horizontal, direction, wherein the second displacement mechanism comprises two opposing blocks provided above the work surface, the blocks being moveable between a retracted position and an operational position, such that in use in the operational position the blocks contact opposing side edges of the battery plates, wherein the second displacement mechanism is configured to shear the plates substantially horizontally, in a direction opposite to that caused by the first displacement mechanism;
   the apparatus further comprising an alignment mechanism for aligning the battery plates in the stack.

2. An apparatus according to claim 1, further comprising a third displacement mechanism, wherein the third displacement mechanism is configured to shear the plates in a direction which is substantially perpendicular to the first direction, such that the third displacement mechanism shears the plates substantially vertically.

3. An apparatus according to claim 2, wherein the third displacement mechanism comprises a mechanism for moving the work surface between
   a first position in which the work surface is angled with respect to a horizontal plane; and
   a second position in which the work surface is substantially aligned with the horizontal plane.

4. An apparatus according to claim 1, wherein the apparatus further includes a splitting mechanism, and wherein the splitting mechanism in use laterally breaks the stack of battery plates into a plurality of stacks.

5. An apparatus for separating battery plates comprising:
a work surface for receiving a stack of battery plates;
a first displacement mechanism configured to shear the plates of the stack relative to each other in a first, substantially horizontal, direction; and,
an alignment mechanism for aligning the battery plates in the stack;
the apparatus further comprising a further displacement mechanism, wherein the further displacement mechanism is configured to shear the plates in a direction which is substantially perpendicular to the first direction, such that the further displacement mechanism shears the plates substantially vertically;
wherein the further displacement mechanism comprises a mechanism for moving the work surface between
a first position in which the work surface is angled with respect to a horizontal plane; and,
a second position in which the work surface is substantially aligned with the horizontal plane.

6. An apparatus according to claim 5, wherein the work surface is provided with an agitator for vibrating a stack of plates on the work surface.

7. An apparatus according to claim 5, wherein the alignment mechanism is provided above the work surface, the alignment mechanism being moveable between an open position and a closed position, in which in use, the alignment mechanism contacts the opposing side edges of the battery plates and moves the battery plates into an aligned stack.

8. An apparatus according to claim 7, wherein the alignment mechanism includes a pair of blocks having opposing flat surfaces, which in use face the opposing side edges of the battery plates.

9. An apparatus as claimed in claim 5, wherein opposing surfaces of the blocks of the first and further displacement mechanisms have corresponding profiles being non-perpendicular to the block movement direction, such that as the blocks move to their operational position the opposing surfaces cause each battery plate to move substantially horizontally by a different amount to its adjacent plate(s).

10. An apparatus as claimed in claim 9, wherein, for each of the first and further displacement mechanisms, a first block has a convex profile, and an opposing second block has a corresponding convex profile.

11. An apparatus for separating battery plates comprising:
a work surface for receiving a stack of battery plates;
a first displacement mechanism configured to shear the plates of the stack relative to each other in a first, substantially horizontal, direction, wherein the first displacement mechanism comprises two opposing blocks provided above the work surface, the blocks being moveable between a retracted position and an operational position, such that in use in the operational position the blocks contact opposing side edges of the battery plates; and
a second displacement mechanism configured to shear the plates of the stack relative to each other in a second, substantially horizontal, direction, wherein the second displacement mechanism comprises two opposing blocks provided above the work surface, the blocks being moveable between a retracted position and an operational position, such that in use in the operational position the blocks contact opposing side edges of the battery plates;
wherein the second displacement mechanism is configured to shear the plates substantially horizontally, in a direction opposite to that caused by the first displacement mechanism;
the apparatus further comprising an alignment mechanism for aligning the battery plates in the stack;
wherein opposing surfaces of the blocks of the first and second displacement mechanisms have corresponding profiles being non-perpendicular to the block movement direction, such that as the blocks move to their operational position the opposing surfaces cause each battery plate to move substantially horizontally by a different amount to its adjacent plate(s);
wherein, for each of the first and second displacement mechanisms, a first block has a convex profile, and an opposing second block has a corresponding convex profile; and
wherein the work surface is provided with an agitator for vibrating a stack of plates on the work surface.

* * * * *